(12) United States Patent
Yang et al.

(10) Patent No.: US 10,772,712 B2
(45) Date of Patent: Sep. 15, 2020

(54) METHODS OF USING HARDENABLE DENTAL ARTICLES

(71) Applicant: 3M INNOVATIVE PROPERTIES COMPANY, St. Paul, MN (US)

(72) Inventors: Jie Yang, Woodbury, MN (US); Naimul Karim, Maplewood, MN (US); Todd D. Jones, St. Paul, MN (US); Gerald S. Deeb, Mendota Heights, MN (US); Dwight W. Jacobs, Hudson, WI (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 703 days.

(21) Appl. No.: 15/324,979

(22) PCT Filed: Jul. 14, 2015

(86) PCT No.: PCT/US2015/040240
§ 371 (c)(1),
(2) Date: Jan. 9, 2017

(87) PCT Pub. No.: WO2016/010942
PCT Pub. Date: Jan. 21, 2016

(65) Prior Publication Data
US 2017/0209245 A1    Jul. 27, 2017

Related U.S. Application Data

(60) Provisional application No. 62/024,708, filed on Jul. 15, 2014.

(51) Int. Cl.
*A61C 13/087* (2006.01)
*A61C 5/30* (2017.01)
(Continued)

(52) U.S. Cl.
CPC ............ *A61C 13/087* (2013.01); *A61C 5/007* (2013.01); *A61C 5/20* (2017.02); *A61C 5/30* (2017.02);
(Continued)

(58) Field of Classification Search
CPC ........... A61C 13/087; A61C 5/70; A61C 5/20; A61C 5/77; A61C 5/30; A61C 5/007
See application file for complete search history.

(56) References Cited

U.S. PATENT DOCUMENTS

| 4,932,869 A | 6/1990 | Bergeron |
| 5,403,188 A | 4/1995 | Oxman |

(Continued)

FOREIGN PATENT DOCUMENTS

| DE | 1020100010069 | 9/2011 |
| JP | 57059529 | 4/1982 |

(Continued)

OTHER PUBLICATIONS

International Search Report for PCT International Application No. PCT/US2015/040240, dated Sep. 25, 2015, 6 pages.

*Primary Examiner* — Nicholas D Lucchesi
(74) *Attorney, Agent, or Firm* — 3M IPC

(57) ABSTRACT

The present application is directed to a method of using a hardenable dental article. The method can include providing the hardenable dental article; applying the hardenable dental article to a dental structure; customizing the shape of the hardenable dental article; and at least partially curing the hardenable dental article.

32 Claims, 1 Drawing Sheet

(51) Int. Cl.
*A61C 5/70* (2017.01)
*A61C 5/77* (2017.01)
*A61C 13/107* (2006.01)
*A61C 5/20* (2017.01)
*A61C 5/00* (2017.01)
*A61C 8/00* (2006.01)
*A61C 13/00* (2006.01)
*A61C 13/15* (2006.01)
*A61C 13/08* (2006.01)

(52) U.S. Cl.
CPC .................. *A61C 5/70* (2017.02); *A61C 5/77* (2017.02); *A61C 8/008* (2013.01); *A61C 13/0001* (2013.01); *A61C 13/0003* (2013.01); *A61C 19/003* (2013.01); *A61C 13/081* (2013.01); *A61C 2202/01* (2013.01)

(56) References Cited

U.S. PATENT DOCUMENTS

| | | | |
|---|---|---|---|
| 5,709,548 A | 1/1998 | Oxman | |
| 6,057,383 A | 5/2000 | Volkel | |
| 6,106,295 A * | 8/2000 | Wilson | A61K 6/083 433/222.1 |
| 6,572,693 B1 | 6/2003 | Wu | |
| 6,624,211 B2 | 9/2003 | Karim | |
| 6,730,156 B1 | 5/2004 | Windisch | |
| 6,799,969 B2 | 10/2004 | Sun | |
| 6,869,666 B2 | 3/2005 | Deeb | |
| 6,935,862 B2 * | 8/2005 | Harlan | A61C 13/0003 433/218 |
| 7,494,339 B2 | 2/2009 | Dias | |
| 7,674,850 B2 | 3/2010 | Karim | |
| 7,811,486 B2 | 10/2010 | Karim | |
| 7,816,423 B2 | 10/2010 | Karim | |
| 8,136,657 B2 | 3/2012 | Karim | |
| 2003/0114553 A1 | 6/2003 | Karim | |
| 2003/0198914 A1 * | 10/2003 | Brennan | A61K 6/0023 433/9 |
| 2005/0040551 A1 | 2/2005 | Biegler | |
| 2005/0042577 A1 | 2/2005 | Kvitrud | |
| 2007/0196792 A1 * | 8/2007 | Johnson | A61C 5/70 433/218 |
| 2010/0203480 A1 | 8/2010 | Schweitzer | |
| 2010/0330524 A1 | 12/2010 | Karim | |
| 2011/0207087 A1 | 8/2011 | Jones | |
| 2013/0210959 A1 | 8/2013 | Yang | |

FOREIGN PATENT DOCUMENTS

| | | |
|---|---|---|
| JP | 2009-100869 | 5/2009 |
| JP | 2012-239660 | 12/2012 |
| WO | WO 95/35071 | 12/1995 |
| WO | WO 1995-35071 | 12/1995 |
| WO | WO 2003-015720 | 2/2003 |
| WO | WO 2005/018484 | 3/2005 |
| WO | WO 2006-020760 | 2/2006 |
| WO | WO 2008-033893 | 3/2008 |
| WO | WO 2008-033911 | 3/2008 |
| WO | WO 2010-057144 | 5/2010 |

* cited by examiner

METHODS OF USING HARDENABLE DENTAL ARTICLES

FIELD

The present disclosure generally relates to methods of using or curing a hardenable dental article.

BACKGROUND

Hardenable dental articles including those comprising hardenable dental compositions, which are malleable and, thereby, customizable, are used extensively in restorative dentistry. For example, tooth repair with temporary and permanent dental articles such as preformed crowns or bridges, is a common procedure, where the restoration process is expedited by using a preformed dental article in the approximate shape of the tooth (or teeth) being restored. When a customized dental article is desired, multiple visits to a dentist are often required with conventional technologies such as adhesives, pastes, two-part powder/liquid systems, preformed metal or polymer temporary crowns, and preformed ceramic or porcelain/metal permanent crowns.

Shrinkage may happen when hardenable dental articles are cured, which ranges from 1% to 2% and above. Such shrinkage can cause problems, for example, micro-leakage of cured hardenable dental articles, an overly tight fit of cured hardenable dental articles to a prepared tooth, etc.

SUMMARY

Some aspects of the present disclosure provide a method of using a hardenable dental article. The method can include providing the hardenable dental article comprising a base, at least one inner surface extending from the base, and an inner film in contact with at least a portion of the at least one inner surface, wherein at least the base and the at least one inner surface of the hardenable dental article comprise a hardenable dental composition and wherein the hardenable dental composition is in a form of a self-supporting malleable structure; applying the hardenable dental article to a dental structure; customizing the shape of the hardenable dental article; at least partially curing the hardenable dental article, wherein the inner film is in contact with at least a portion of the at least one inner surface during the curing step; and removing the inner film from the hardened dental article.

Some aspects of the present disclosure provide a method of curing a hardenable dental article. The method can include providing the hardenable dental article, the dental article comprising a base, at least one inner surface extending from the base, and an inner film in contact with at least a portion of the at least one inner surface, wherein at least the base and the at least one inner surface of the hardenable dental article comprise a hardenable dental composition and wherein the hardenable dental composition is in a form of a self-supporting malleable structure; applying the hardenable dental article to a tooth surface in an oral cavity of a subject; customizing the shape of the hardenable dental article; and at least partially curing the hardenable dental article, wherein the inner film is in contact with at least a portion of the at least one inner surface during the curing step.

Other features and aspects of the present disclosure will become apparent by consideration of the detailed description.

DEFINITIONS

The term "dental article" includes, for example, temporary, intermediate, and permanent crowns, bridges, implants, artificial teeth, inlays, onlays, veneers, temporary restorations, implant healing caps, tooth splints, implant abutments, copings, posts, bridge frameworks and other bridge structures, and abutments.

The term "dental structure" includes, for example, but is not limited to teeth including prepared teeth, artificial teeth of typodonts or other models (e.g. casts, stone or wax models, and 3D printed model), implants, implant healing caps, and implant abutments.

The term "malleable" refers, for example, to an article, such as a hardenable dental article, which can be custom-shaped and fitted under a moderate manual force (i.e., a force that ranges from light finger pressure to that applied with manual operation of a small hand tool, such as a dental composite instrument) at temperatures of 15° C. to 40° C. The shaping, fitting, forming, etc., can be performed by adjusting the external shape and/or internal cavity shape of the hardenable dental article without adding material or removing material other than at or adjacent to the margin. In one example, the article can be fitted onto a prepared tooth.

The term "hardenable" refers to polymerizable and/or crosslinkable.

The term "self-supporting" as used herein refers to an article, for example a hardenable dental article, which is dimensionally stable (will maintain its shape without significant deformation) at room temperature (i.e., about 20° C. to about 25° C.) for at least about two weeks when free-standing (i.e., without the support of packaging or a container). This definition applies in the absence of conditions that activate any initiator system and in the absence of an external force other than gravity.

The term "preformed" refers to an article, for example a hardenable dental article, which is formed in a shape suitable for use with no customizing or with customizing, as required for any one particular application.

The term "substantially the same" refers in typical embodiments of the present disclosure to a difference of not more than 20 percent, preferably not more than 10 percent, more preferably not more than 5 percent.

The term "comprising" and variations thereof (e.g., comprises, includes, etc.) do not have a limiting meaning where these terms appear in the description and claims.

As used herein, "a," "an," "the," "at least one," and "one or more" are used interchangeably, unless the context clearly dictates otherwise. As used in this specification and the appended claims, the term "or" is generally employed in its sense including "and/or" unless the content clearly dictates otherwise.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the present specification and attached claims are approximations that can vary depending upon the desired properties sought to be obtained by those skilled in the art utilizing the teachings disclosed herein.

Also herein, the recitation of numerical ranges by endpoints includes all numbers subsumed within that range (e.g. 1 to 5 includes 1, 1.5, 2, 2.75, 3, 3.80, 4, and 5) and any range within that range.

The above summary of the present invention is not intended to describe each disclosed embodiment or every implementation of the present invention. The description that follows more particularly exemplifies illustrative embodiments.

DETAILED DESCRIPTION

Figure 1:
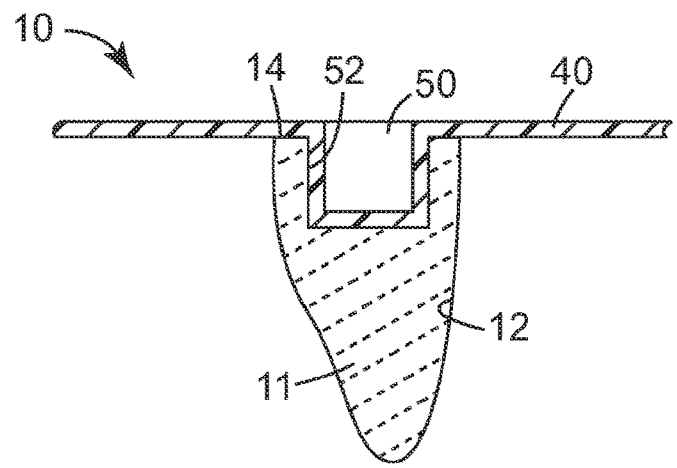
FIG. 1 is a cross-sectional view of an embodiment of a hardenable dental article of the present application.

Before any embodiments of the present disclosure are explained in detail, it is understood that the invention is not limited in its application to the details of use, construction, and the arrangement of components set forth in the following description. The invention is capable of other embodiments and of being practiced or of being carried out in various ways that will become apparent to a person of ordinary skill in the art upon reading the present disclosure. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is understood that other embodiments may be utilized and structural or logical changes may be made without departing from the scope of the present disclosure.

Shrinkage is a common problem for dental composites used in hardenable dental articles. For example, shrinkage can cause micro-leakage of cured hardenable dental articles. When the hardenable dental article is a crown, shrinkage can also cause an overly tight fit of the cured crown to a prepared tooth, or that the cured crown may not seat down all the way to the prepared tooth. This can, for example, lead to a poor marginal fit to the prepared tooth and larger marginal gaps and/or an excessively high occlusal surface. In addition, if undercuts are present on the tooth including the prepared tooth, the lockage from undercuts may cause potential fracture of the cured crown and/or the tooth. Any of these results can cause the need for additional time and effort by the dentist, either in terms of additional adjustments of the restoration at placement, or potential repair or replacement at subsequent appointments.

The present disclosure generally relates to methods of using or curing a hardenable dental article. Generally, the hardenable dental article can include a base, at least one inner surface extending from the base, and an inner film in contact with at least a portion of the at least one inner surface. Particularly, the inner film of the hardenable dental article can accommodate the shrinkage of the hardenable dental articles. In addition, the inner film can have a lubricating effect, providing for easy removal of the hardenable dental article. Further, when the hardenable dental article is a crown, the inner film can provide a uniform gap/space between the cured crown and a prepared tooth after the inner film is removed so that the crown can be seated down all the way to the prepared tooth, thereby providing a better marginal fit as well as the proper occlusal height.

For certain embodiments, the hardenable dental article described herein can be a crown, an inlay, an onlay, a bridge, a veneer, a maxillofacial prosthesis, an artificial tooth, and a tooth splint. For certain of these embodiments, the hardenable dental article can be a crown. In some embodiments, the hardenable dental article can be a preformed hardenable dental article.

In FIG. 1, one embodiment of a hardenable dental article 10 used in the method described herein is illustrated in a cross-sectional view. Hardenable dental article 10 comprising hardenable dental composition 11, in the shape of a crown, typically has base 14, outer surface 12, and interior cavity 50 with inner surfaces 52 extending from base 14. Inner film 40 is in contact with inner surfaces 52. As shown in FIG. 1, inner film 40 extends beyond the base 14. In alternative embodiments (not shown), the inner film does not extend beyond the base. With inner film 40 present, interior cavity 50 can be mated with a prepared tooth surface for proper gap/spacing. The shape of the inner cavity can be a cylindrical cavity.

Figure 2:
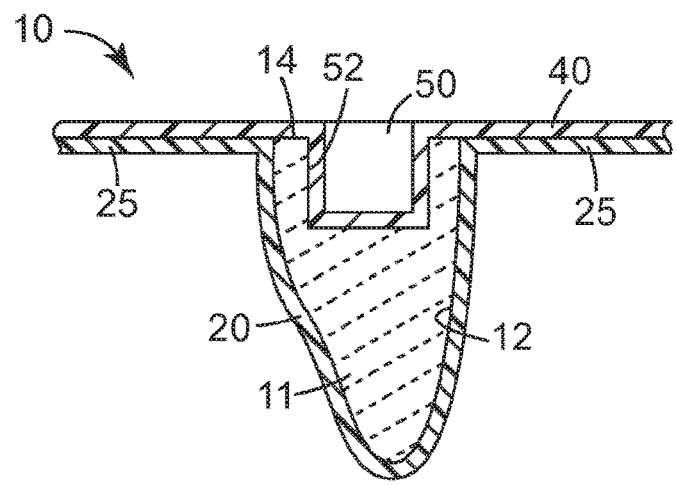
FIG. 2 is a cross-sectional view of an alternative embodiment of a hardenable dental article of the present application.

In FIG. 2, one alternative embodiment of a hardenable dental article used in the method described herein is illustrated in a cross-sectional view. An optional outer film 20 is in intimate contact with outer surface 12 of hardenable dental article 10. Flanges 25, also illustrated in FIG. 2, are an extension of outer film 20, and although optional, in some embodiments, flanges 25 are present for ease of removing outer film 20 from hardenable dental article 10 at an appropriate time. Portions of outer film 20 and inner film 40 may be bonded together to seal hardenable dental composition 11 between outer film 20 and inner film 40.

Hardenable Dental Composition

The hardenable dental articles described herein comprise a hardenable dental composition. For certain embodiments, this composition can be malleable at temperatures of 15° C. to 40° C. For certain of these embodiments, the hardenable dental composition can be malleable in a temperature range of room temperature to 38° C.

Examples of some potentially suitable hardenable dental compositions that may be used to construct the hardenable dental articles described herein with sufficient malleability may include, for example, hardenable organic compositions (filled or unfilled), polymerizable dental waxes, hardenable dental compositions having a wax-like or clay-like consistency in the unhardened state, and the like. In some embodiments, the hardenable dental articles are constructed of hardenable compositions that consist essentially of non-metallic compositions.

Suitable hardenable dental compositions that may be used to manufacture the hardenable dental articles described herein include, for example, compositions described in U.S. Patent Application Publication No. US 2003/0114553, titled HARDENABLE SELF-SUPPORTING STRUCTURES AND METHODS (Karim et al.). Other suitable hardenable compositions may include those described in International Publication No. WO 2010/057144 (Jones et al.); U.S. Pat. No. 5,403,188 (Oxman et al.); U.S. Pat. No. 6,057,383 (Volkel et al.); U.S. Pat. No. 6,799,969 (Sun et al.); and U.S. Pat. No. 7,816,423 (Karim et al.).

Organogelators described in International Publication No. WO 2008/033911 titled DENTAL COMPOSITIONS INCLUDING ORGANOGELATORS, PRODUCTS, AND METHODS can be included with the hardenable dental compositions in the dental articles described herein. These organogelator compositions can be packable or self-supporting.

For certain embodiments, the hardenable dental composition of any one of the embodiments described herein can be a photopolymerizable composite comprising a resin system, a filler system, and an initiator system, and wherein the photopolymerizable composite is self-supporting and malleable. The resin system can include one or more hardenable organic resins suitable for use in the oral environment, capable of forming a hardened composition having sufficient strength.

In some such embodiments, at least some of the resin components can include ethylenic unsaturation and are capable of undergoing additional polymerization. In some embodiments, a suitable resin can include at least one ethylenically unsaturated monomer (i.e., includes at least one carbon-carbon double bond). Suitable resin systems may include those described in U.S. Pat. No. 7,816,423 (Karim et al.).

In some such embodiments, the resin system can include a crystalline component to impart the (e.g. a noncovalent) three-dimensional structure for maintaining the initial pre-formed shape such as described in International Publication No. WO 2010/057144 (Jones et al.); U.S. Pat. No. 7,674,850 (Karim et al.) and U.S. Pat. No. 7,816,423 (Karim et al.) incorporated herein by reference. This crystalline component may or may not have a reactive group capable of polymerizing (also including crosslinking) In some embodiments, the crystalline component can be polymerizable. In some embodiments, the crystalline component can be polymeric (including oligomeric). In some embodiments, the crystalline component can be a polymerizable polymeric material.

Fillers for use in the filler system may be selected from a wide variety of conventional fillers for incorporation into resin systems. In some embodiments, the filler system includes one or more conventional materials suitable for incorporation in compositions used for medical applications, for example, fillers currently used in dental restorative compositions. Fillers may be either particulate or fibrous in nature. The filler can be an inorganic material. It can also be a crosslinked organic material that is insoluble in the resin, and is optionally filled with inorganic filler. Suitable filler may include those described in U.S. Pat. No. 7,816,423 (Karim et al.).

The initiators for use in the initiator system, i.e., one initiator or a mixture of two or more initiators, which are suitable for hardening (e.g., polymerizing and/or crosslinking) of the resin system, can be free radical initiators, which may be activated in a variety of ways, e.g., heat and/or radiation. Thus, for example, the initiator system can be a thermal initiator system (e.g., azo compounds and peroxides), or a photoinitiator system. In some embodiments, the initiator system includes one or more photoinitiators. In some such embodiments, the initiator system includes at least one photoinitiator active in the spectral region of about 300 nanometers (nm) to about 1200 nm and capable of promoting free radical polymerization and/or crosslinking of ethylenically unsaturated moieties upon exposure to light of suitable wavelength and intensity. A wide variety of such photoinitiators can be used. Suitable initiators may include those described in U.S. Pat. No. 7,816,423 (Karim et al.).

Film

The hardenable dental articles described herein comprise an inner film in contact with at least a portion of the at least one inner surface of the hardenable dental articles. In some embodiments, the inner film can cover about 80%, about 90%, about 95%, about 100%, 100% or a range between and including any two of these values of the inner surface of the hardenable dental article. In some embodiments, the hardenable dental article can include an optional outer film in contact with at least a portion of the at least one outer surface of the hardenable dental articles.

For certain embodiments, the inner film or outer film can be a homopolymer film or a single layer film. Suitable polymers include linear low density polyethylene, EVA copolymers, and the like.

In some embodiments, the inner film and/or outer film can be a multi-layer polymeric film. Suitable multi-layer polymeric film may include those described in International Publication No. WO 2010/057144 (Jones et al.). In some embodiments, the multi-layer polymeric films can include at least two dissimilar polymers in separate layers. For example, an outer layer may include at least one polymer, and an inner core layer may include at least one polymer that is different than at least one polymer comprising the outer layer. For certain embodiments, including any one of method embodiments described herein, the dissimilar polymers differ from each other in a characteristic selected from the group consisting of composition, crystallinity, modulus, maximum elongation, strain recovery, recovery load, surface energy, an optical property, and a combination thereof. Examples of polymers dissimilar in composition may include, but are not limited to, elastic and plastic polymers, homopolymers and copolymers, polymers of different molecular weights, polymers of different densities, one type of polymer and another type of polymer, for example, polyethylene and sytrene-isoprene-styrene block copolymer, different molecular structure (e.g., linear vs. branched), different amounts of a polymer, different phase morphology, and the like. Crystallinity differences may arise due to differences in comonomer content, differences in branching, differences in molecular weight, and the like. Crystallinity differences may translate to different elongation, modulus, density, and/or recovery properties in the separate layers. Surface energy differences may provide good release from the hardenable dental article and/or from a mold while providing good adhesion between layers. Optical properties can include transparency, opacity, percent haze, surface gloss, color, and the like.

In some embodiments, the multi-layer polymeric films used in the hardenable dental articles of method embodiments described herein can include at least two layers, which include a first outer layer and a second core layer. Each of these layers may be comprised of one, two, or more layers. In other embodiments, the multi-layer polymeric film can include at least three layers, including a first outer layer, a second core layer, and a third outer layer. Each of these layers may be comprised of one, two, or more layers. For certain of these embodiments, the first outer layer and the third outer layer can exert substantially the same recovery load. With substantially the same recovery load on each major surface of the multi-layer film, any curl in the film or other defect caused by an imbalance in recovery loads after undergoing a strain, such as linear, biaxial or radial stretching, is reduced or eliminated. The outer layers, also known as skin layers, can be balanced even though the skin layers are different materials, different combinations of materials, and/or different thicknesses.

In some embodiments, including any one of the above method embodiments where the multi-layer polymeric film comprises a first outer layer and a second core layer, at least one of the first outer layer and the second core layer can release from the hardenable dental composition without substantially deforming a shape of the hardenable dental article. In some such embodiments, at least one of the first outer layer and the second core layer can release from a mold or pin surface without substantially deforming the shape of the hardenable dental article. In some such embodiments, at least one of the first outer layer and the second core layer can release from a tooth (including a prepared tooth) surface without substantially deforming the shape of the hardenable dental article. For certain of these embodiments, the second core layer can contain a release additive distributed throughout the layer. Release additives include, for example, silicone oils. Other release additives include, for example, waxes and extrudable fluorochemical polymers. The first outer layer may optionally include a release additive, although it is preferred that a release additive which could migrate into the hardenable dental composition not be included in a layer of the multi-layer film that is in contact with the hardenable dental composition.

In some embodiments, including any one of the above embodiments which includes at least one outer layer, suitable outer layers can include a thermoplastic polymer, as described in International Publication No. WO 2010/057144, which includes, but is not limited to, high density polyethylene, low density polyethylene, very low density polyethylene, polypropylene, poly(ethylene-co-propylene), poly(ethylene-co-hexene), poly(ethylene-co-octene), poly (ethylene-co-butene), poly(ethylene-co-vinyl acetate), poly (ethylene-co-vinyl alcohol), a polyurethane, and a combination thereof. For certain of these embodiments, the thermoplastic polymer can be selected from the group consisting of isotactic polypropylene, poly(ethylene-co-propylene) impact copolymer, high density polyethylene, and a combination thereof. A combination thereof includes copolymers and/or blends. For certain of these embodiments, the thermoplastic polymer can be high density polyethylene.

In some embodiments, which include a second core layer in the multi-layer polymeric film, the second core layer can include, but is not limited to, an elastic material, a plastic material, or a combination thereof. For certain of these embodiments, the second core layer can include, but is not limited to, a polymer selected from the group consisting of linear low density polyethylene, very low density polyethylene, ultra-low density polyethylene, styrene-isoprene-styrene block copolymers, styrene-ethylene-co-butylene-styrene block copolymers, elastomeric polyurethanes, poly (ethylene-co-vinyl acetate), ethylene-propylene elastomeric copolymers, ethylene-propylene-diene elastomeric terpolymers, poly(ethylene-co-hexane), poly(ethylene-co-octene), poly(ethylene-co-butane), and a combination thereof. For certain of these embodiments, the second core layer can include, but is not limited to, a polymer selected from the group consisting of very low density polyethylene, ultra-low density polyethylene, styrene-isoprene-styrene block copolymers, styrene-ethylene-co-butylene-styrene block copolymers, and a combination thereof. A combination thereof includes copolymers and/or blends. For certain of these embodiments, the second core layer can include ultra-low density polyethylene.

In some embodiments, the inner film can be non-transparent, colored, or having colored patterns. A colored inner film or an inner film with colored patterns can, for example, be visualized and remind dentists to remove the inner film.

In some embodiments, the inner film can be coated with an adhesive layer on the side in contact with the inner surface of the hardenable dental articles to promote or increase the adhesion of the inner film to the inner surface of the hardenable dental articles. In other embodiments, the adhesive layer can comprise pressure sensitive adhesive or a heat activated adhesive, or a combination thereof. In some embodiments, the inner film can be primed or surface-treated to increase the adhesion of the inner film to the inner surface of the hardenable dental articles. Suitable surface treatments can include, but are not limited to, corona treatment (including corona treatment at elevated film temperature), flame treatments, plasma treatment and chemical priming.

Method of Making

The hardenable dental articles were prepared essentially as described in International Publication No. WO 2010/057144; U.S. Pat. No. 7,811,486 and U.S. Pat. No. 8,136,657, which are hereby incorporated by reference in its entirety. In some embodiments, an inner film can be disposed over a hardenable dental composition. The inner film and hardenable dental composition are forced (simultaneously or sequentially) into a mold cavity to form a hardenable dental article having the shape of the mold cavity. Hardenable dental composition can be provided in any shape or form that can be accommodated by the mold cavity. An optional outer film can be disposed between the mold cavity and hardenable dental composition such that the hardenable dental composition is disposed between the inner film and the outer film. The process illustrated in such embodiments can be described as a compression molding process. It should, however, be understood that the hardenable dental composition may be formed into the hardenable dental article shape by other suitable processes. Some suitable processes may include, but are not limited to, e.g., injection molding, forging, casting, vacuum forming, extrusion molding, thermoforming, transfer molding, blow molding, etc.

Method of Use

In some embodiments, the shape of the hardenable dental article used in the method can be that of a crown, an inlay, an onlay, a bridge, a veneer, a tooth facsimile, a temporary crown or restoration, an implant healing cap, or a tooth splint. In some embodiments, the shape of the hardenable dental article can be that of a crown. For certain embodiments, the hardenable dental article can be a self-supporting malleable hardenable crown. In the context of the self-supporting malleable hardenable crown, such a crown typically has an outer surface and an inner surfaces extending from a base, and an inner film in contact with the inner surface.

In such certain embodiments, an appropriate shape and size of a self-supporting malleable crown is selected. The crown is seated on a prepared tooth to determine the extent of trimming and shaping required, optionally making marks on the crown (for instance, marking near the base of the crown to provide reference points where the crown should be trimmed along perimeter of the margin such as to provide a good fit to a prepared tooth). In some such embodiments, the crown can be optionally removed from prepared tooth and the required shape and size adjustments can be made by cutting, trimming, shaping, etc. (if desired). In some of these embodiments, an inner film can remain in contact with at least a portion of the at least one inner surface of the crown during the cutting, trimming, shaping, etc. In some of these embodiments, the inner film of the crown does not extend substantially outside the perimeter of the base of the crown (e.g., after cutting the uncured crown). In some of these embodiments, the self-supporting malleable hardenable dental composition of the crown may be exposed at the margin of the crown.

The crown is then re-seated on the tooth preparation where additional shape customizing is made at room temperature by a variety of methods including applying pressure with fingers or an instrument of choice (e.g., hand operation of composite tools), trimming, cutting, sculpting, grinding, etc. to provide optimum custom fit, including gingival, lateral, and occlusal fit. The customizing the shape of the crown can occur inside or outside the oral cavity of a subject.

Figure 3:
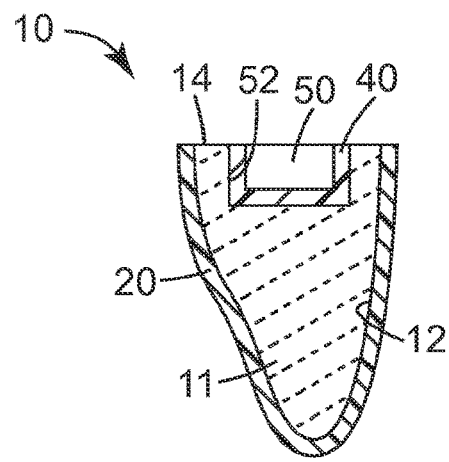
FIG. 3 is a cross-sectional view of an embodiment of a trimmed and/or customized hardenable dental article of the present application.

Typically, as illustrated in FIG. 3, after the crown has been trimmed and/or customized, no portion of the inner film extends beyond the interior cavity of the crown. In this manner, immediately prior to (or during) the curing of the crown, no portion of the inner film is in contact with teeth immediately adjacent to the tooth being restored or the prepared tooth. In certain embodiments, the self-supporting malleable hardenable dental composition of the crown may contact gingival tissue during and/or after the customizing of the crown.

Once the desired custom shape has been achieved, the article is at least partially hardened (e.g., cured) by exposing it to heat/radiation to cause activation of the initiator system. This can be done either in a single step, or in multiple steps with successive steps of custom shaping being done in-between. In some embodiments, the reshaped crown can then be cured, typically by exposing it to a dental curing light for a few seconds, if desired, while in the oral cavity, and then removing it carefully from the oral cavity and exposing it for final cure to a curing light in a cure chamber, optionally in combination with heat. Alternatively, in other embodiments, the reshaped crown can be at least partially cured outside the oral cavity. In some other embodiments, the crown can also be completely cured in the mouth by irradiating it with a dental curing light.

In some embodiments, the inner film can remain in contact with at least a portion of the inner surface of the crown during the customizing step or curing step. In other embodiments, the inner film of the crown can be in contact with at least a portion of the prepared tooth surface during the customizing step and/or curing step. If the inner film is maintained in contact with the inner surface of the crown during curing, it may, for example, protect the inner surfaces of the crown from, e.g., exposure to oxygen before and during the curing process. In addition, the inner film retained in place during curing may prevent the unnecessary adhesion of the hardenable dental composition of the crown to the prepared tooth during curing. If the inner film is to be retained in place during curing, the inner film may, for example, be flexible to allow the dentist to customize or shape the crown before curing (if desired).

After the final shaping and hardening steps, the inner film can be removed from the cured crown. In some embodiments, the inner film can be removed in a single piece. Removing the inner film can, for example, provide a small uniform gap between the cured crown and the prepared tooth, so as to avoid an overly tight fit due to, for example, the shrinkage of the crown or lockage from undercuts of the prepared tooth. Further, removing the inner film can provide the appropriate gap/clearance for cementing the cured crown.

After the hardening steps, the hardened crown can be further modified in shape/finished by contouring, grinding, trimming, etc., if desired. Once the final custom shape of the crown has been obtained, the finished crown can be polished, cleaned, painted, or surface treated, if required for the intended application. The intended application may require mounting, bonding, or otherwise attaching the custom shaped cured crown to a second object adhesively, mechanically, or by combination of both. The finished crown can then be cemented as is or lined with a suitable resin composition prior to placement in the mouth.

In some embodiments, the self-supporting malleable hardenable crown may have an optional outer film in contact with at least a portion of the outer surface of the crown. In some of these embodiments, the optional outer film can be removed before use. In others of these embodiments, the outer film can be completely or partially in contact with the outer surface of the crown during the use of the crown. In some of these other embodiments, the outer film can remain in contact with at least a portion of the outer surface during the customizing step or curing step. If the outer film is maintained in contact with the outer surface of the crown during the customizing step or curing step, it may, for example, provide a tab for ease of removing the crown from the prepared tooth. In some other embodiments, the outer film can be transparent to facilitate the curing of the crown.

As will be appreciated by those of skill in the art, the current application could be applied to other hardenable articles than a crown based on the teaching disclosed herein.

The following embodiments are intended to be illustrative of the present disclosure and not limiting.

EMBODIMENTS

Embodiment 1 is a method of using a hardenable dental article, comprising:
providing the hardenable dental article comprising a base, at least one inner surface extending from the base, and an inner film in contact with at least a portion of the at least one inner surface, wherein at least the base and the at least one inner surface of the hardenable dental article comprise a hardenable dental composition and wherein the hardenable dental composition is in a form of a self-supporting malleable structure;
applying the hardenable dental article to a dental structure;
customizing the shape of the hardenable dental article;
at least partially curing the hardenable dental article, wherein the inner film is in contact with at least a portion of the at least one inner surface during the curing step; and
removing the inner film from the hardened dental article.

Embodiment 2 is a method of using a hardenable dental article, comprising:
providing the hardenable dental article, the dental article comprising a base, at least one inner surface extending from the base, and an inner film in contact with at least a portion of the at least one inner surface, wherein at least the base and the at least one inner surface of the hardenable dental article comprise a hardenable dental composition and wherein the hardenable dental composition is in a form of a self-supporting malleable structure;
applying the hardenable dental article to a tooth surface in an oral cavity of a
subject; customizing the shape of the hardenable dental article; and
at least partially curing the hardenable dental article, wherein the inner film is in contact with at least a portion of the at least one inner surface during the curing step.

Embodiment 3 is the method of embodiment 2, further comprising removing the inner film after the curing step.

Embodiment 4 is the method of any of embodiments 1 to 3, wherein the shape of the hardenable dental article is customized before the applying step, after the applying step, or both before and after the applying step.

Embodiment 5 is the method of any of embodiments 1 to 4, wherein the customizing the shape of the hardenable dental article occurs inside the oral cavity of a subject.

Embodiment 6 is the method of any of embodiments 1 to 5, further comprising cutting the hardenable dental article before the curing step, after the curing step, or both before and after the curing step, wherein the inner film remains in contact with at least a portion of the at least one inner surface during the cutting step.

Embodiment 7 is the method of any of embodiments 1 to 6, wherein the inner film remains in contact with at least a portion of the at least one inner surface during the customizing step or curing step.

Embodiment 8 is the method of any of embodiments 1 to 7, wherein the inner film is in contact with at least a portion of the tooth surface during the customizing step or curing step.

Embodiment 9 is the method of any of embodiments 1 to 8, wherein the inner film is removed in a single piece.

Embodiment 10 is the method of any of embodiments 1 to 9, wherein the inner film is non-transparent, colored, or having colored patterns.

Embodiment 11 is the method of any of embodiments 1 to 10, wherein the inner film is coated with an adhesive layer.

Embodiment 12 is the method of embodiment 11, wherein the adhesive layer comprises a pressure sensitive adhesive or a heat activated adhesive, or a combination thereof.

Embodiment 13 is the method of any of embodiments 1 to 12, wherein the hardenable dental article is a preformed hardenable dental article.

Embodiment 14 is the method of any of embodiments 1 to 13, wherein the hardenable dental article is at least partially cured inside the oral cavity.

Embodiment 15 is the method of any of embodiments 1 to 14, wherein the hardenable dental article is at least partially cured outside the oral cavity.

Embodiment 16 is the method of any of embodiments 1 to 15, further comprising final contouring and shaping of the hardened dental article.

Embodiment 17 is the method of any of embodiments 1 to 16, further comprising finishing the hardened dental article.

Embodiment 18 is the method of any of embodiments 1 to 17, further comprising polishing the hardened dental article.

Embodiment 19 is the method of any of embodiments 1 to 18, further comprising cementing the hardened dental article.

Embodiment 20 is the method of any of embodiments 1 to 19, wherein the hardenable dental article further comprises at least one outer surface extending from the base and an outer film in contact with at least a portion of the at least one outer surface.

Embodiment 21 is the method of embodiment 20, wherein the outer film remains in contact with at least a portion of the at least one outer surface during the customizing step or curing step.

Embodiment 22 is the method of embodiment 20, wherein the outer film is transparent.

Embodiment 23 is the method of any of embodiments 1 to 22, wherein the shape of the hardenable dental article is that of a crown, an inlay, an onlay, a bridge, a veneer, a tooth facsimile, a temporary crown or restoration, an implant healing cap, or a tooth splint.

Embodiment 24 is the method of any of embodiments 1 to 23, wherein the shape of the hardenable dental article is that of a crown.

Embodiment 25 is the method of any of embodiments 1 to 24, wherein the inner film or outer film is a multi-layer polymeric film, wherein the multi-layer polymeric film comprises at least two dissimilar polymers in separate layers.

Embodiment 26 is the method of embodiment 25, wherein the at least two dissimilar polymers differ from each other in a characteristic selected from the group consisting of composition, crystallinity, modulus, strength, maximum elongation, strain recovery, recovery load, surface energy, an optical property, and a combination thereof.

The following working examples are intended to be illustrative of the present disclosure and not limiting.

EXAMPLES

Objects and advantages of this invention are further illustrated by the following examples, but the particular materials and amounts thereof recited in these examples, as well as other conditions and details, should not be construed to unduly limit this invention. Unless otherwise indicated, all parts and percentages are on a weight basis.

TABLE 1

Abbreviations, Descriptions, and Sources of Crown Paste Materials and Precursors Thereto

| Abbreviation | Description and Source (Unless otherwise indicated, available from Sigma-Aldrich, St. Louis, MO.) |
|---|---|
| IEM | 2-Isocyanatoethyl methacrylate (CAS No. 30674-80-7), available from Showa Denko, Japan |
| CAPA2125 | Polycaprolactone (CAS No. 36890-68-3), available from Solvay Chemical Co., Warrington, United Kingdom |
| Tone 230 | Polycaprolactone (CAS No. 36890-68-3), from Dow Chemical Co., Midland, MI |
| TPEG 990 | Polymer of ethylene oxide (CAS No. 31694-55-0), available from Dow Chemical Co. |
| BisGMA | Bisphenol A diglycidyl ether methacrylate (CAS No. 1565-94-2) |
| BisEMA-6 | 6-Mole ethoxylated bisphenol A dimethacrylate (CAS No. 41637-38-1), available from Sartomer Co., Inc., Exton, PA as "CD-541." |
| TEGDMA | Triethyleneglycol dimethacrylate (CAS No. 109-16-0), available from Sartomer Co., Inc. |
| Procrylate | 2,2-Bis-4-(3-hydroxypropoxyphenyl)propane dimethacrylate (CAS No. 27689-12-9), prepared as described in WO2006/020760 |
| UDMA | Diurethane dimethacrylate (CAS No. 72869-86-4), available from Dajac Laboratories, Trevose, PA |
| BHT | 2,6-Di-tert-butyl-4-methylphenol (CAS No. 128-37-0) |
| Tinuvin R 796 | Polymerizable benzotriazole UV stabilizer (CAS No. 96478-09-0), available from Ciba Specialty Chemicals, Tarrytown, NY |
| Dibutyltin dilaurate | CAS No. 77-58-7 |
| Photoinitiator Package Components | |
| CPQ | Camphorquinone (CAS No. 10373-78-1) |
| EDMAB | Ethyl 4-(N,N-dimethylamino) benzoate (CAS No. 10287-53-3) |
| DPIHFP (DPIPF$_6$) | Diphenyliodonium hexafluorophosphate (CAS No. 58109-40-3), available from Alfa Aesar, Ward Hill, MA |
| Pigments | |
| Red pigment | Viscous dispersion containing red iron(III) oxide pigment |
| White pigment | Viscous dispersion containing rutile titanium dioxide pigment |
| Black pigment | Viscous dispersion containing a black iron oxide (Fe$_3$O$_4$) pigment |
| Yellow pigment | Viscous dispersion containing a yellow iron III oxide pigment |
| Inorganic Fillers | |
| SiO$_2$/ZrO$_2$ nanocluster | Silane-treated zirconia/silica nanocluster filler prepared essentially as described in U.S. Pat. No. 6,730,156 at column 25, lines 50-63 (Preparatory Example A) and at column 25, line 64 through column 26, line 40 (Preparatory Example B) |
| 20 nm Silica Nanomer | Silane-treated nano-sized silica having a nominal particle size of approximately 20 nanometers, prepared essentially as described in U.S. Pat. No. 6,572,693, at column 21, |

TABLE 1-continued

Abbreviations, Descriptions, and Sources of
Crown Paste Materials and Precursors Thereto

| Abbreviation | Description and Source (Unless otherwise indicated, available from Sigma-Aldrich, St. Louis, MO.) |
|---|---|
| CAB-O-SIL M-5 | lines 63-67 (Nanosized particle filler, Type #2) Fumed silica available from Cabot Corp., Boston, MA |
| S/T Filler | Silane-treated zirconia silica filler, prepared essentially as described in U.S. Pat. No. 6,624,211 at column 15, line 59 through and column 16, line 28 |

Preparation of Polycaprolactone-IEMs (CAPA2125-IEM and Tone 230-IEM)

To a glass jar was added ~50 grams (g) of the selected polycaprolactone (i.e., CAPA2125 or Tone 230) and BHT (~0.04 g), and this was heated in an oil bath to 60° C. After melting the solid polycaprolactone and under magnetic stirring, 2 molar equivalents of IEM (~7.8 g) was added over 15 minutes. A drop (~0.02 g) of dibutyltin dilaurate was added to the mixture. The reaction was continued at 60° C. for 12 hours. The resulting white solids were characterized by IR and NMR and confirmed to be the desired polycaprolactone-IEMs (CAPA2125-IEM and Tone230-IEM).

Preparation of Crown Pastes

To prepare the crown pastes, the components listed in Table 2 were mixed as follows. Pigments were uniformly mixed with the resin components, then the filler was added with further mixing until a paste of uniform consistency was obtained.

TABLE 2

Paste Formulations (wt %)

| | Paste A | Paste B | Paste C |
|---|---|---|---|
| BisGMA | 3.2212 | 14.4383 | 10.5498 |
| BisEMA6 | 5.6370 | 1.0313 | |
| TEGDMA | 0.8053 | | |
| UDMA | 3.2212 | 1.0313 | |
| Procrylate | 3.2212 | | |
| CAPA2125-IEM | 4.0270 | 4.1252 | |
| Tone 230-IEM | | | 9.0960 |
| TPEG990 | | | 0.6000 |
| $SiO_2/ZrO_2$ nanocluster | 56.1630 | 57.2451 | |
| 20 nm Silica nanomer | 19.6770 | 19.0817 | |
| CAB-O-SIL M-5 | 3.1597 | 2.1600 | 2.1698 |
| S/T Filler | | | 76.7302 |
| Red pigment dispersion | 0.0100 | 0.0100 | 0.0117 |
| White pigment dispersion | | | 0.1065 |
| Black pigment dispersion | | | 0.0002 |
| Yellow pigment dispersion | 0.0430 | 0.0430 | 0.0613 |
| CPQ | 0.0595 | 0.0610 | 0.0345 |
| EDMAB | 0.2186 | 0.2240 | 0.2032 |
| DPIHFP | 0.1747 | 0.1790 | 0.1016 |
| BHT | 0.0332 | 0.0340 | 0.0305 |
| Tinuvin R 976 | 0.3280 | 0.3360 | 0.3048 |

TABLE 3

Descriptions and Sources of Single Layer Polymeric Films

| Single Layer Film | Description |
|---|---|
| Cotran 9715 | Single layer film, 75 micron (μm) thickness, available from Exxon material LD728.61 which is poly(ethylene-co-vinyl acetate) containing 19% vinyl acetate (EVA copolymer) |
| Pliant 808 | Single layer film, linear low density polyethylene film |

TABLE 3-continued

Descriptions and Sources of Single Layer Polymeric Films

| Single Layer Film | Description |
|---|---|
| | (LLDPE), 97 μm thickness, available from Pliant Plastics Corporation, Spring Lake, MI |
| Parafilm M | Single layer polyolefin/paraffin wax film, 130 μm thickness, available from American Can Company, Greenwich, CT |

Preparation of Multi-Layer Polymeric Films

Elastomeric laminates were prepared by co-extruding a sheet of elastomeric core material with two skin layers, one on either side of the core layer, essentially as described in Example 1 of U.S. Pat. No. 6,869,666. Thus, the elastomeric laminates had a three-layer structure (i.e., skin-core-skin), with both skin layers having the same composition and thickness.

The core and skin materials that were used, along with their suppliers, are summarized in the following Table 4 of materials. The detailed multi-layer film structures are described in Table 5.

TABLE 4

Descriptions and Sources of Materials Used to Prepare Multi-layer Polymeric Films

| Material | Description | Placement in Multi-layer Film |
|---|---|---|
| PP 3155 | Polypropylene (PP) homopolymer, available from ExxonMobil Company, Houston, TX | Skin |
| M6060 | High density polyethylene (HDPE), available from Equistar Chemicals, Houston, TX | Skin |
| Engage 8200G | Ultra low density polyethylene (ULDPE), available from Dow Chemical Company, Midland, MI | Core |
| Blue Dye | 5% Blue EVA copolymer masterbatch, available from Clariant Corporation, Charlotte, NC | Core |

TABLE 5

Multi-layer Polymeric Film Structures

| Film ID# | Core Material (Thickness, μm) | Skin Material (Thickness, μm) |
|---|---|---|
| 8064A | Engage 8200G (93 μm)* | M6060 (17 μm) |
| 8082D | Engage 8200G (141 μm) | M6060 (9.4 μm) |
| 8082E | Engage 8200G (129.2 μm) | M6060 (13.2 μm) |
| 8101C | Engage 8200G (58 μm) | PP 3155 (10 μm) |
| 8104C | Engage 8200G (108 μm) | M6060 (16.7 μm) |

*Blue dye in core layer

Crown Formation and Handling Assessment

Crowns were prepared by a process, essentially as described in U.S. Pat. No. 7,811,486, which is hereby incorporated by reference in its entirety. In particular, samples of each paste to be tested were injected into a mold cavity lined with a first film, Cotran 9715. This first film would eventually be present on the outer surface of the eventually formed hollow crown. The sample of a given paste, along with the Cotran 9715 film was transferred to a second multi-part mold, covered with a second film (a single layer film from Table 3 or a multilayer film from Table 5) and compression molded to form a hollow crown shape (shaped as a symmetric model first molar with a mesial-distal dimension of approximately 10.6 mm). Thus, the second film was present on the inner surface of the hollow crown.

The hollow crown samples (with associated inner and outer film) were evaluated by an experienced dentist who customized the crowns on a prepared artificial tooth in a Columbia Dentoform R862 Typodont, at the #31 position. The typodont tooth was modified to have a shoulder preparation. The crown samples were evaluated by:

1. Removing the outer Cotran 9715 film from the uncured crown.
2. Trimming the margin of the uncured crown with crown scissors, with the inner film in place.
3. Customizing the crown, including adapting the crown to the tooth preparation, with the inner film in place.
4. Light curing the crown with the inner film in place, with the crown seated on the tooth preparation and/or after the crown was removed from the tooth preparation.
5. Removing the inner film from the cured crown.
6. Placing cured crown back on the tooth preparation and checking for proper fit of the cured crown.

Overall acceptability of the handling was assessed based on ability to trim, adjust, and smooth the crown before cure, and proper fit of the crown after cure. The evaluation results are shown in Table 6. In general, it was found that the uncured crowns with inner films could be cut and trimmed without delamination of the inner film and the uncured crowns could be customized and adapted with the inner film in place. The crowns could be cured with the inner film in place, whether on or off of the tooth preparation. In most instances, the inner film could be easily removed in a single piece from the cured crown. Removal of the film from the cured crown provided a gap to accommodate cement during cementation of the crown to the tooth preparation, such that the crown could be fully seated (despite the crown having undergone polymerization shrinkage during the curing).

TABLE 6

Crown Customizing/Placement Evaluation Results

| Example | Paste Formulation (Table 1) | Outer Film | Inner Film | Results |
| --- | --- | --- | --- | --- |
| EX1 | Paste A | Cotran 9715 | 8064A | Good |
| EX2 | Paste A | Cotran 9715 | 8082D | Good |
| EX3 | Paste A | Cotran 9715 | 8082E | Good |
| EX4 | Paste A | Cotran 9715 | 8104C | Good |
| EX5 | Paste B | Cotran 9715 | 8101C | Good |
| EX6 | Paste C | Cotran 9715 | 8101C | Good |
| EX7 | Paste C | Cotran 9715 | Pliant 808 | Good |
| EX8 | Paste C | Cotran 9715 | ParaFilm M | Acceptable* |

*ParaFilm M could not be removed in one piece after light curing (step 5).

All references and publications cited herein are expressly incorporated herein by reference in their entirety into this disclosure. Illustrative embodiments of this invention are discussed and reference has been made to possible variations within the scope of this invention. For example, features depicted in connection with one illustrative embodiment may be used in connection with other embodiments of the invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. A method of using a hardenable dental article, comprising:
    providing the hardenable dental article comprising a base, at least one inner surface extending from the base, and an inner film in contact with at least a portion of the at least one inner surface, wherein at least the base and the at least one inner surface of the hardenable dental article comprise a hardenable dental composition and wherein the hardenable dental composition is in a form of a self-supporting malleable structure;
    applying the hardenable dental article to a dental structure;
    customizing the shape of the hardenable dental article; and
    at least partially curing the hardenable dental article to provide a hardened dental article, wherein the inner film is in contact with at least a portion of the at least one inner surface during the curing step.

2. The method of claim 1, further comprising removing the inner film from the hardened dental article.

3. The method of claim 1, wherein customizing the shape of the hardenable dental article occurs before the applying step, after the applying step, or both before and after the applying step.

4. The method of claim 1, wherein customizing the shape of the hardenable dental article occurs inside the oral cavity of a subject.

5. The method of claim 1, further comprising cutting the hardenable dental article before the curing step, after the curing step, or both before and after the curing step, wherein the inner film remains in contact with at least a portion of the at least one inner surface during the cutting step.

6. The method of claim 1, wherein the inner film remains in contact with at least a portion of the at least one inner surface during the customizing step or curing step.

7. The method of claim 1, wherein the inner film is in contact with at least a portion of tooth surface during the customizing step or curing step.

8. The method of claim 1, wherein the inner film is removed in a single piece.

9. The method of claim 1, wherein the inner film is non-transparent, colored, or patterned.

10. The method of claim 1, wherein the inner film is coated with an adhesive layer.

11. The method of claim 1, wherein the hardenable dental article is a preformed hardenable dental article.

12. The method of claim 1, wherein the hardenable dental article is at least partially cured inside the oral cavity of a subject.

13. The method of claim 1, wherein the hardenable dental article further comprises at least one outer surface extending from the base and an outer film in contact with at least a portion of the at least one outer surface.

14. The method of claim 13, wherein the outer film remains in contact with at least a portion of the at least one outer surface during the customizing step or curing step.

15. The method of claim 1, wherein the hardenable dental article is in the form of a crown, an inlay, an onlay, a bridge, a veneer, a tooth facsimile, a temporary crown or restoration, an implant healing cap, or a tooth splint.

16. The method of claim 1, wherein the inner film comprises a multi-layer polymeric film, wherein the multi-layer polymeric film comprises at least two dissimilar polymers in separate layers.

17. The method of claim 1, wherein the applying of the hardenable dental article is to a tooth surface in an oral cavity of a subject.

18. The method of claim 17, further comprising removing the inner film after the curing step.

19. The method of claim 17, wherein customizing the shape of the hardenable dental article occurs before the applying step, after the applying step, or both before and after the applying step.

20. The method of claim 17, wherein customizing the shape of the hardenable dental article occurs inside the oral cavity of a subject.

21. The method of claim 17, further comprising cutting the hardenable dental article before the curing step, after the curing step, or both before and after the curing step, wherein the inner film remains in contact with at least a portion of the at least one inner surface during the cutting step.

22. The method of claim 17, wherein the inner film remains in contact with at least a portion of the at least one inner surface during the customizing step or curing step.

23. The method of claim 22, wherein the inner film is in contact with at least a portion of the tooth surface during the customizing step or curing step.

24. The method of claim 17, wherein the inner film is removed in a single piece.

25. The method of claim 17, wherein the inner film is non-transparent, colored, or patterned.

26. The method of claim 17, wherein the inner film is coated with an adhesive layer.

27. The method of claim 17, wherein the hardenable dental article is a preformed hardenable dental article.

28. The method of claim 17, wherein the hardenable dental article is at least partially cured inside the oral cavity of a subject.

29. The method of claim 17, wherein the hardenable dental article further comprises at least one outer surface extending from the base and an outer film in contact with at least a portion of the at least one outer surface.

30. The method of claim 29, wherein the outer film remains in contact with at least a portion of the at least one outer surface during the customizing step or curing step.

31. The method of claim 17, wherein the hardenable dental article is in the form of a crown, an inlay, an onlay, a bridge, a veneer, a tooth facsimile, a temporary crown or restoration, an implant healing cap, or a tooth splint.

32. The method of claim 17, wherein the inner film comprises a multi-layer polymeric film, wherein the multi-layer polymeric film comprises at least two dissimilar polymers in separate layers.

* * * * *